US007551933B2

(12) United States Patent
Michaels et al.

(10) Patent No.: US 7,551,933 B2
(45) Date of Patent: *Jun. 23, 2009

(54) TELECOMMUNICATIONS SYSTEM

(75) Inventors: Wayne David Michaels, Berkshire (GB); Anthony Richard Timson, Middlesex (GB); Aden William Dervan, London (GB)

(73) Assignee: Celltrace LLC, Addison, TX (US)

( * ) Notice: Subject to any disclaimer, the term of this patent is extended or adjusted under 35 U.S.C. 154(b) by 342 days.

This patent is subject to a terminal disclaimer.

(21) Appl. No.: 10/215,989

(22) Filed: Aug. 9, 2002

(65) Prior Publication Data

US 2004/0106416 A9  Jun. 3, 2004
US 2005/0026635 A2  Feb. 3, 2005

Related U.S. Application Data

(63) Continuation of application No. 09/455,628, filed on Dec. 7, 1999, now Pat. No. 6,453,167, which is a continuation of application No. 08/557,147, filed as application No. PCT/GB94/01295 on Jun. 15, 1994, now Pat. No. 6,011,976.

(30) Foreign Application Priority Data

Jun. 15, 1993  (GB)  ................................. 9312320.6
Jul. 2, 1993   (GB)  ................................. 9313772.7
Jul. 8, 1993   (GB)  ................................. 9314096.0

(51) Int. Cl.
H04W 4/00  (2006.01)
H04B 1/38  (2006.01)
H04M 1/00  (2006.01)

(52) U.S. Cl. ...................... 455/466; 455/558; 455/420
(58) Field of Classification Search ......... 455/418–420, 455/466, 558, 422.1, 425, 550.1, 551, 556–557, 455/70, 88, 564, 186.1; 340/311.2, 7.2
See application file for complete search history.

(56) References Cited

U.S. PATENT DOCUMENTS 4,477,808 A   10/1984  Ichikawa
4,523,297 A   6/1985   Ugon et al.

(Continued)

FOREIGN PATENT DOCUMENTS

AU          643526         5/1991

(Continued)

OTHER PUBLICATIONS

Klaus Vedder, "Security Aspects of Mobile Communications", 1991.*

(Continued)

*Primary Examiner*—Nguyen Vo
(74) *Attorney, Agent, or Firm*—Groover & Associates

(57) ABSTRACT

In a telecommunications system such as a global mobile telephone network in which each subscriber unit includes a Subscriber Identity Module (SIM card), each SIM card has fixed memory locations, to which data can be addressed over the air. Some of the locations can not be overwritten from the subscriber unit but can be accessed therefrom on the entry of short simple codes, each associated with one of the locations. Further fixed memory locations can be read over the air only when the subscriber enters a personal identification number. Locking control files are used to control read/write access to the locations respectively.

20 Claims, 6 Drawing Sheets

U.S. PATENT DOCUMENTS

| | | | |
|---|---|---|---|
| 4,777,355 A | | 10/1988 | Takahira |
| 4,816,654 A | | 3/1989 | Anderl et al. |
| 4,817,190 A | | 3/1989 | Comroe et al. |
| 4,831,647 A | | 5/1989 | D'Avello et al. |
| 4,839,628 A | | 6/1989 | Davis et al. |
| 4,852,146 A | | 7/1989 | Hathcock et al. |
| 4,885,762 A | * | 12/1989 | Suzuki et al. ............... 455/565 |
| 4,907,270 A | | 3/1990 | Hazard |
| 5,012,234 A | | 4/1991 | Dulaney et al. |
| 5,038,025 A | | 8/1991 | Kodera |
| 5,043,723 A | | 8/1991 | Araki et al. |
| 5,046,082 A | | 9/1991 | Zicker et al. |
| 5,109,403 A | | 4/1992 | Sutphin |
| 5,127,040 A | | 6/1992 | D'Avello et al. |
| 5,128,981 A | | 7/1992 | Tsukamoto et al. |
| 5,140,561 A | | 8/1992 | Miyashita et al. |
| 5,170,490 A | * | 12/1992 | Cannon et al. ................ 455/72 |
| 5,179,373 A | | 1/1993 | John |
| 5,225,826 A | | 7/1993 | DeLuca et al. |
| 5,233,656 A | | 8/1993 | Langrand et al. |
| 5,247,519 A | * | 9/1993 | Snowden et al. ............ 370/313 |
| 5,252,964 A | * | 10/1993 | Tan et al. ..................... 340/7.4 |
| 5,349,696 A | | 9/1994 | Matai |
| 5,353,328 A | | 10/1994 | Jokimies |
| 5,359,182 A | * | 10/1994 | Schilling .................... 235/380 |
| 5,404,580 A | * | 4/1995 | Simpson et al. ............. 455/558 |
| 5,430,892 A | | 7/1995 | Motegi |
| 5,465,401 A | | 11/1995 | Thompson |
| 5,473,690 A | | 12/1995 | Grimonprez et al. |
| 5,555,446 A | | 9/1996 | Jasinski |
| 5,687,398 A | | 11/1997 | Martineau |
| 5,752,177 A | * | 5/1998 | Siegle et al. ............. 455/186.1 |
| 5,896,507 A | | 4/1999 | Martineau |
| 6,011,976 A | | 1/2000 | Michaels et al. |

FOREIGN PATENT DOCUMENTS

| | | | |
|---|---|---|---|
| DE | 3721360 A1 | 1/1989 | |
| DE | 4023785 A1 | 1/1992 | |
| EP | 0252580 A2 | 1/1988 | |
| EP | 0278312 A2 | 8/1988 | |
| EP | 0 292 248 A2 | 11/1988 | |
| EP | 0459344 A | 12/1991 | |
| EP | 0478231 A2 | 4/1992 | |
| EP | 0 252 850 B1 | 9/1992 | |
| EP | 0509781 A2 | 10/1992 | |
| EP | 0510322 A2 | 10/1992 | |
| EP | 0562890 A1 | 9/1993 | |
| EP | 0 472 813 | 12/1998 | |
| EP | 0 472 813 B1 | 12/1998 | |
| FR | 2 624 679 A1 | 6/1989 | |
| FR | 2624676 A1 | 6/1989 | |
| FR | 2 638 868 B1 | 12/1990 | |
| FR | 0459344 A1 | 12/1991 | |
| FR | 2 673 476 A1 | 9/1992 | |
| GB | 2173623 A | 10/1986 | |
| GB | 2227584 A | 8/1990 | |
| GB | 2249923 A | 5/1992 | |
| JP | 55132146 A | 10/1980 | |
| JP | 58-131831 | 1/1982 | |
| JP | 59-226994 | 12/1984 | |
| JP | 1985-178913 | 2/1987 | |
| JP | 64-54437 | 4/1989 | |
| JP | 03-239026 | 10/1991 | |
| JP | 03-289823 | 12/1991 | |
| JP | 03-295327 | 12/1991 | |
| JP | 04-114522 | 4/1992 | |
| JP | 04-503747 | 7/1992 | |
| JP | 04-302245 | 10/1992 | |
| JP | 04-316227 | 11/1992 | |
| WO | WO 85/02738 | 6/1985 | |
| WO | WO 87/07060 | 11/1987 | |
| WO | WO 91/12698 | 8/1991 | |
| WO | WO 92/14329 A1 | 8/1992 | |
| WO | WO 92/19093 | * 10/1992 | |
| WO | WO 94/03023 | 2/1994 | |
| WO | WO 94/10657 A1 | 5/1994 | |

OTHER PUBLICATIONS

L. Dittrich Siemens, et al; Implementation of the GSM-Date-Services Into the Mobile Radio System; Mobile Radio Conference; Nov. 13, 1991; pp. 73-83.

Guide Utilisateur de la Carte M.P. (Guide for the Implementation of a Global P.M. Solution); Bull CP8-TU0167F01; Sep. 1989.

Guide de Mise en Oeuvre D'une Solution Globale M.P. (User's Guide to the P.M. Card); Bull CP8-TU0167F01; Sep. 1989.

User Guide for M.P. Security Modules; Bull CP8-TU0168F01; Sep. 1989; pp. 83, 84, 88, 154, 155.

Recommendation GSM 11.11; Specification of the SIM-ME Interface; Released version Jan. 1991:3.6.0; Updated version Apr. 1991: 3.7.0.

Recommendation GSM 11.11; Specification of the SIM-ME Inerface; Previously distributed version: 3.9.0 (Updated Release Jan. 1990); New Released version Feb. 1992: 3.10.0 (Release 92. Phase 1).

Echo des Recherches, Une Application de la carte a microporcesseur; le module d'identite d'abonne du rediotelephone numerique europeen, 1990, No. 139, 1er Tri., Issy/Moulineaux, FR, pp. 13-20.

Report of the GSM-WP1 meeting, Amsterdam, Dec. 1987, "Subscriber Identity Modules".

TIMEG 08, Wiesbaden, May 14-15, 1991 "Public Key Cryptography and Over-the-Air Registration'.".

Report of the 9$^{th}$ SIMEG meeting, May 3, 1989, Gemenos.

Report of ETS1 TC SMG, Meeting #6, Reading Mar. 29-Apr. 2, 1993, "Phase 2+, Future Work Items Description Sheets.", 1993.

Document GSM 173/87, "Functional splitting of the mobile station in mobile equipment and subscriber identity module," Sep. 1987.

English Translation of JP 03-239026, 1991.

English Translation of JP 59-226994, 1984.

English Translation of JP 64-54437, 1989.

Peyret, P. et al, "Smart Cards Provide Very High Security and Flexibility in Subscribers Management", IEEE Transactions on Consumer Electronics, vol. 36, No. 3, Aug. 1990.

Hegenbarth, M., "IC Card Protocols—The State of ISO Standardisation", Escat, 1989, Helsinki, Sep. 6-8, 1989.

Hegenbath, M., "SC Standardization Works—From Confusion to Clarity?", ESCAT 1992, Helsinki, Sep. 2-4, 1992.

Letter from M. Hegenbarth regarding ETSI SIMEG 48/89, Nov. 9, 2003.

Recommendation GSM 02.09, "Security Aspects", Previously released version 1992: 3.0.1; updated version Jun. 1993: 3.1.0, ETSI/TC GSM.

Recommendation GSM 02.09, "Security Aspects", Feb. 1992, version 02.09.

Translation of letter dated Nov. 26, 2007, Swisscom Opposition regarding EP 704140.

Holley, K. "The GSM Short Message Service" IEE Colloquium on GSM and PCN Enhanced Mobile Services, IEE, London, GB, Jan. 30, 1991, pp. 7-1, XP000653942.

"Results of the ISO/JTC1/SC17/WG4/T.F.3 Meeting in Rennes on Provisional Interindustry Commands for International Interchange", *German Delegate of ISO/JTC1/SC17/WG4/Task Force*, Jan. 1989, pp. 1-4, [SIMEG 13/89].

"Requirements for SIMEG Based on the Results of the ISO/JTC1/SC17/WG4/T.F.3 Meeting in Rennes", *Deutsche Bundespost*, Jan. 1989, 1 pg., [SIMEG 14/89].

"Provision for Application Transparency in the GSM Recommendation 11.11", *Deutsche Bundespost*, Mar. 1989, pp. 1-3, [SIMEG 48/89].

"Draft Agenda of the 10$^{th}$ SIMEG Meeting", *SIMEG-Gemenos*, May 1989, pp. 1-5, [SIMEG 58/89].

"Preliminary Report of the 9$^{th}$ SIMEG Meeting", *SIMEG-Gemenos*, May 1989, p. 1, [SIMEG 55/89].

G. Lisimaque, et al., "The Select Function in the GSM Card", pp. 1-3; [SIMEG 67/89], 1989.

R. Lozach, "Data Security in the Radiotelephone Card", p. 1, [SIMEG 68/89], 1989.

"Additions to GSM Rec. 11.11 to provide for application transparency", *Deutsche Bundespost*, May 1989, 6 Pgs., [SIMEG 70/89].

M. Hegenbarth, "Refinements of status bytes SW1 SW2", *Deutsche Bundespost*, Jun. 1989, 1 Pg., [SIMEG 71/89].

M. Hegenbarth, "Protocol for: Command/Response both containing Data; Commands to be send by the ICC", *Deutsche Bundespost*, Jun. 1989, 1 Pg, [SIMEG 72/89].

"New Function of the mobile Equipment: Transparent Application Data Transfer", SIMEG, May 1989, 1 Pg. [SIMEG 80/89].

Terms of Reference for Special Working Group on SIM Specification, SIMEG, May 1989, 5 pgs., [SIMEG 81/89].

"Preliminary Report of the 10$^{th}$ SIMEG Meeting", *SIMEG-Paris*, Jul. 1989, pp. 1-5, [SIMEG 84/89].

Report of the GSM1 (GSM/WP1) Meeting in Helsinki, May 1989, 15 Pgs., [SIMEG 97/89].

P. Hiolle, et al., "Application Selection in the Radiotelephone Card", *French Contribution to CEPT/SIMEG*, Jul. 1989, pp. 1-2, [SIMEG 102/89].

"Report of the 10$^{th}$ SIMEG Meeting", *SIMEG-Paris*, Jul. 1989, pp. 1-5, [SIMEG 117/89].

"Preliminary Report of the 11$^{th}$ SIMEG Meeting", *SIMEG-Lung*, Jul. 1989, pp. 1-7, [SIMEG 119/89].

M. Hegenbarth, "Fax to G. Mazziotto of DNET—Paris", Sep. 1989, 1 Pg., [SIMEG 126/89].

"Preliminary Report of the 12$^{th}$ SIMEG Meeting", *SIMEG-Paris*, Oct. 1989, pp. 1-10, [SIMEG 144/89].

"Additions to GSM Rec. 11.11 to provide for application transparency", Deutsche Bundespost, Nov. 1989, 6 pgs., [SIMEG 159/89].

F. Trosby, "Short Message Storage Capabilities of SIMs", Telefax, Jul. 1990, 4 Pgs., [SIMEG 7/90].

"Report of the 13$^{th}$ SIMEG Meeting", *SIMEG-Berlin*, Jan. 1990, pp. 1-8, [SIMEG 23/90].

"Minutes of the Report of GSMI/ 6$^{th}$ Meeting on SMS" *Bonn*—Aug. 1991, 2 pgs., [SIMEG 90/91].

"Report of the 23$^{rd}$ SIMEG Meeting", *SIMEG-Stuttgart*, Oct. 1991, pp. 1-6, [SIMEG 133/91].

M. Hegenbarth, "Adoption of Remote ICC Application (RIA) in GSM Cards"., *SIMEG-Paris*, Jan. 1992, pp. 1-2, [SIMEG 15/92].

"Preliminary Report of the 25$^{th}$ SIMEG Meeting", *SIMEG-Paris*, Jan. 1991, pp. 1-4, [SIMEG 27/92].

"GSM 07.06 related", *SMGI—Paris*, Oct. 1992, 1 pg., [SIMEG 139/92].

SIMEG-Nuremburg, Dec. 1992, 1 pg., [SIMEG 144/92].

"Report of the 29th SIMEG Meeting", *SIMEG-The Hague*, Jan. 1993, pp. 1-6, [SIMEG 12/93].

M. Hegenbarth, "News from ISO and CEN", *SIMEG-Paris*, Mar. 1993, 4 Pgs., [SIMEG 126/93].

"Comm ents on work Item—Inteworking with Non-GSM Applications on the SIM", *Cellnet*, May 1993, 2 pgs., [SIMEG 47/93].

Letter from Schlumberger Sema regarding EP748135, Dec. 1, 2003 with 6 identified enclosures.

"Draft Report of the 32$^{nd}$ Meeting of ETSI STC SMGI/SIMEG", May 1993, pp. 1-5, [SIMEG 56/93].

P. Jolie et al., "A microprocessor card application: the European digital radiotelephone subscriber identity module", L'echo des recherches, pp. 13-20 (English Transation), 1990.

Translation of Letter dated Feb. 6, 2009 from Blumbach & Zinngrebe to the European Patent Office on behalf of T-Mobile Deutschanld GmbH, Notice of Intervantion, Opposition against EP0704140.

Translation of Letter dated Feb. 6, 2009 from Wolf & Lutz to the European Patent Office on behalf of debitel AG, Notice of Intervention, Opposition against EP0704140.

* cited by examiner

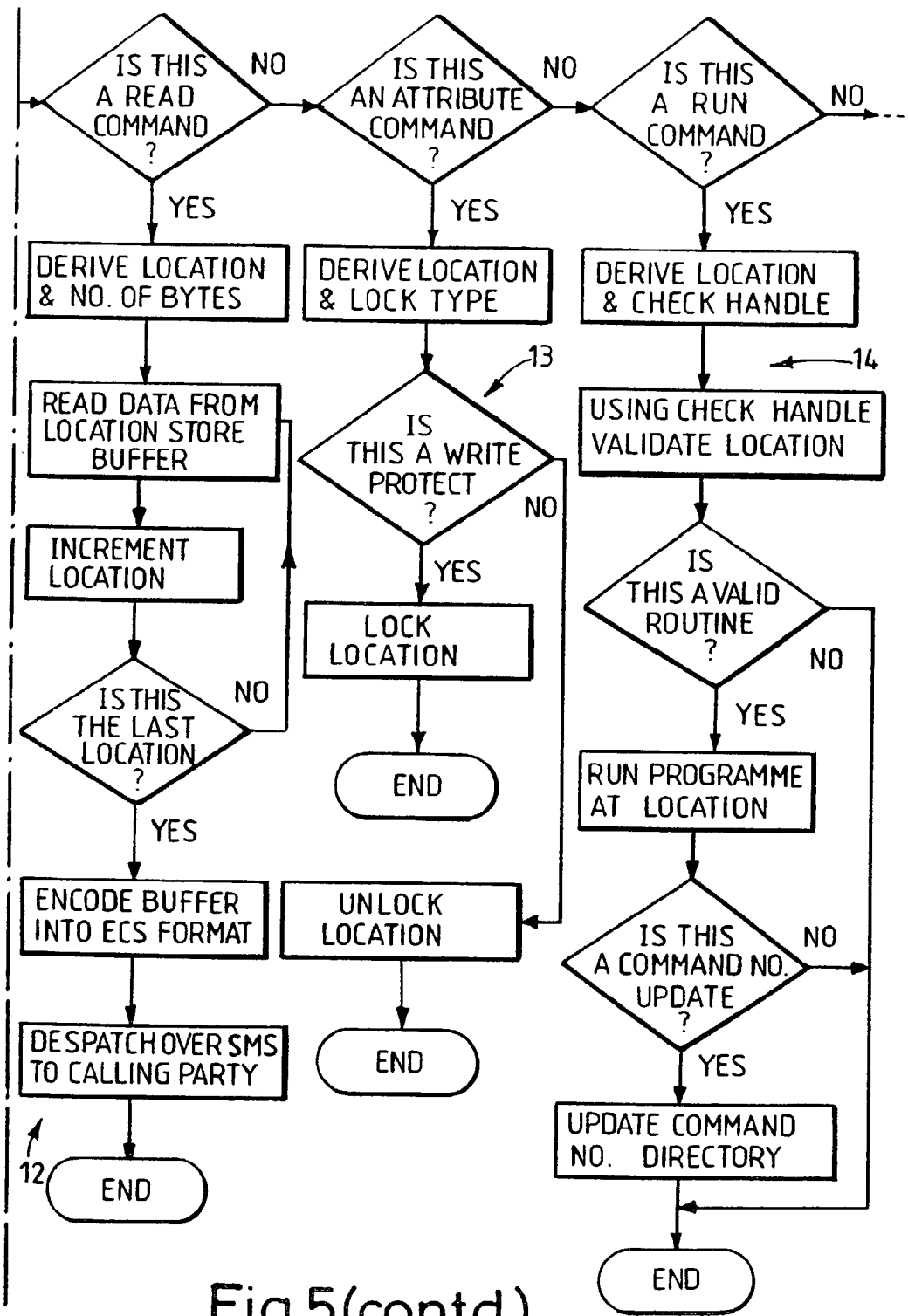
Fig.5(contd.)

TELECOMMUNICATIONS SYSTEM

CROSS REFERENCE TO RELATED APPLICATIONS

This application claims priority under 35 USC § 120 and is a continuation of U.S. application Ser. No. 09/455,628, filed Dec. 7, 1999, now U.S. Pat. No. 6,453,167, which is a Continuation of U.S. application Ser. No. 08/557,147, filed Apr. 19, 1996, now U.S. Pat. No. 6,011,976, which is a national application of prior International Application No. PCT/GB94/01295, filed Jun. 15, 1994. U.S. application Ser. Nos. 09/455,628 and 08/557,147 are incorporated herein by reference.

BACKGROUND OF THE INVENTION

This invention relates to a telecommunications system. In particular, but not exclusively, it relates to a mobile communications system such as a cellular mobile radio or telephone system.

A recent innovation in such systems has been the introduction of Subscriber Identity Modules (SIM cards). These are integrated circuit cards which can be releasably inserted into a mobile telephone and which contain in memory the subscriber's identity, i.e., his telephone number. These known SIM cards also have a rolling buffer which can store a certain number of alphanumeric characters. The buffer facilitates the so-called Short Message Service (SMS) in which a message for a subscriber or for a specified group of subscribers can be broadcast over the air, as an advanced form of radiopaging. Messages can be received by a mobile telephone whenever it is idle or on stand-by. However, if a message is received which would overfill the buffer, data is lost on a first-in-first-out basis.

It is an object of the invention to provide a more efficient and remotely reconfigurable SIM card.

SUMMARY OF THE INVENTION

From one aspect, the present invention consists in a telecommunications system comprising at least one host station and a plurality of subscriber units, the or each host station being operable to transmit a message to at least one of the subscriber units, and each subscriber unit having a multiplicity of fixed memory locations and means responsive to the detection of the message to store the message in a selected one of the fixed memory locations which can not be overwritten from the subscriber unit, but which can be accessed from the subscriber unit when required.

In the present application, a "fixed" memory location means a location into which data can be written, and excludes first-in-first-out or circular buffers. Overwriting of all the data in certain "fixed" memory locations may occur in contrast to the first-in-first-out loss of data experienced with current SMS buffers.

Thus, for example, a set of telephone numbers, each with an identifying alphanumeric tag, can be transmitted to the SIM card, allowing users easy access to commonly used services such as hotels, car hire or airline reservations. This feature is known as a Value Added Service Directory.

A message may be retrievable by the subscriber on the entry of simple, short codes into the subscriber unit, each memory location corresponding to a particular code. A message may include a telephone number and, once stored, may be able to be overwritten over the air. Preferably, the or each host station is operable to transmit a request for information stored in a subscriber unit. The information may be included in a message and it may also include information which is stored in a secure memory location, accessible only when the subscriber enters a personal identification number (PIN number). The information may include credit details relevant to the subscriber, for example, a credit card number of credit status, thus greatly facilitating credit card transactions carried out over the telephone. Using this feature of the invention, a credit account holder avoids having to dictate his account details and need only enter the mandatory PIN number.

The host station may be operable to transmit instructions to lock and/or unlock a memory location at the subscriber unit. It may be operable to transmit instructions to run a program stored in memory locations at the subscriber unit. The host station may be operable to transmit files containing functional data and/or files containing non-functional data to the subscriber unit. The messages, requests for information and the instructions being transmitted may be in a specific format which the subscriber unit is able to distinguish from other formats. The specific format may be made secure against interception.

In a preferred embodiment, the subscriber unit comprises a mobile radio or telephone and an integrated circuit card which can be removably connected to the radio/telephone. The integrated circuit card may contain the memory locations and may contain means for distinguishing the specific format from other formats. The card may contain means for distinguishing between the messages, requests for information and instructions. The card may also contain the means for storing the messages and means for acting on the requests and instructions.

From another aspect, the invention consists in a module for controlling a subscriber unit in a telecommunications system, comprising a multiplicity of fixed memory locations and means responsive to the detection of a message transmitted remotely thereto to store the message in a selected one of the fixed memory locations, and being adapted for removable connection to a transceiver of the subscriber unit.

At least one of the fixed memory locations may be protected from overwriting by the subscriber. The module or card may include means for rendering any or all of said fixed memory locations accessible or inaccessible by either the subscriber or the host station. The card may include a directory structure within which files can be stored.

The invention is particularly applicable to global telecommunication systems in which the mobile cellular telephone networks of various countries or areas communicate using a common standard. An example of such a global system is GSM (Global System for Mobile Communications) currently operating in Europe. However the invention is not limited to global systems and could be applied to a single national cellular network or even to a fixed land-linked network.

BRIEF DESCRIPTION OF THE DRAWINGS

An embodiment of the invention will now be described by way of example with reference to the accompanying drawings in which.

DETAILED DESCRIPTION OF THE INVENTION

Figure 1:
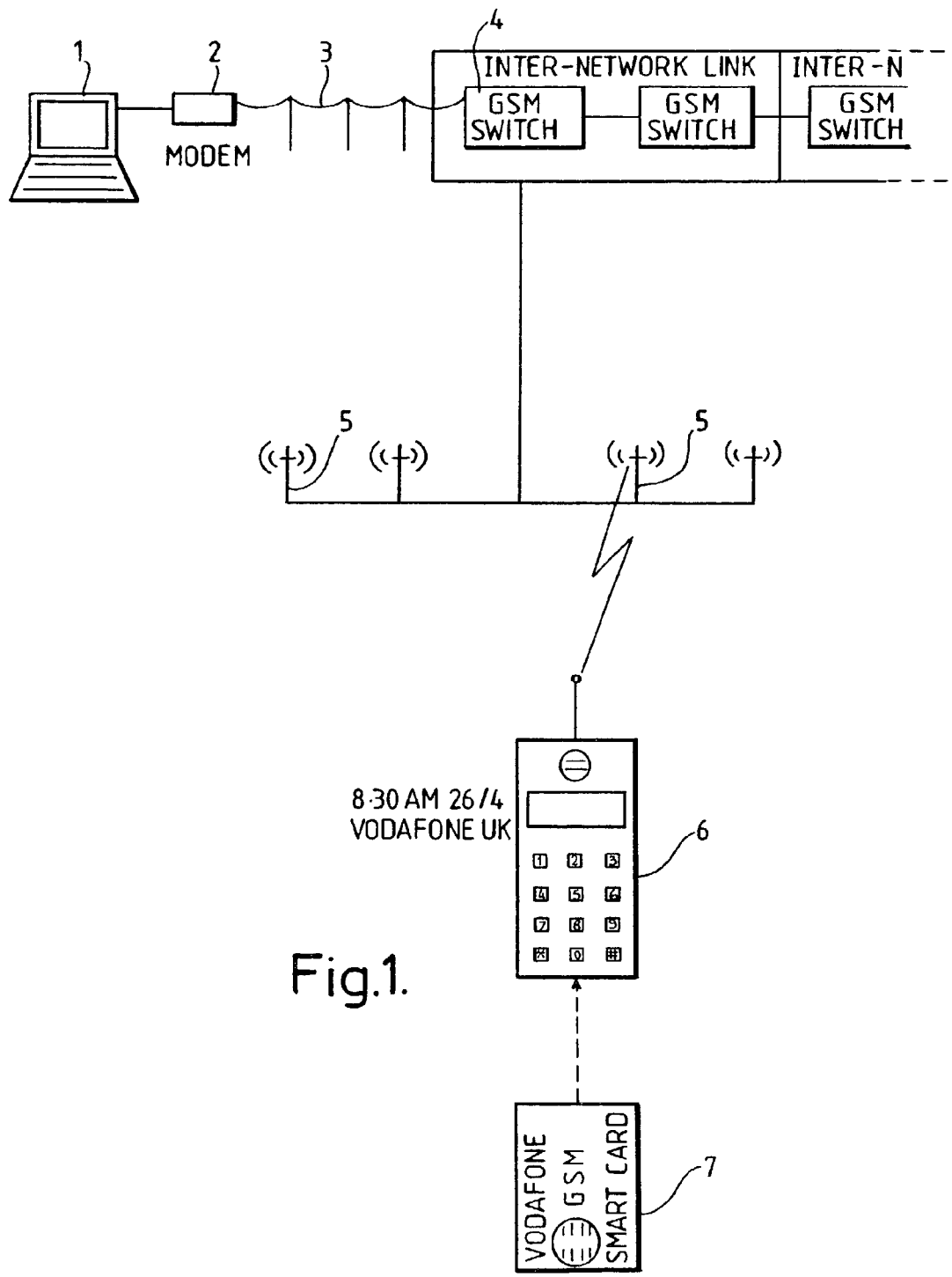
FIG. 1 shows the transmission of messages to a subscriber unit in a system according to the invention.

FIG. 1 illustrates an SMS distribution path according to the invention. In the prior art, the short messages have usually been directed to a single subscriber or a specified group of subscribers such as a sales team.

However, GSM also supports a feature known as Cell Broadcast in which messages can be sent to all the subscribers in a particular area. In the embodiment of the invention illustrated, a message consists of the telephone number of an advertiser and an alphanumeric tag to identify the advertiser.

An operator enters the message into a terminal 1. The message is then coded into a secure format known to applicants as an Embedded Command Stream (ECS) and sent via a modem 2 and a fixed line 3 to a local GSM switch 4. According to its delivery address, the message is delivered to any or all of the other switches within that network, or even across networks.

The switch 4, which in this example is in the geographical area to which the message is to be transmitted, delivers the message to a number of cellsites 5. The cellsites 5 are the base transceiver stations of the GSM network.

Each cellsite 5 then broadcasts the message to a group of transceivers or mobile telephones, hereinafter referred to as "mobiles". If Cell Broadcast is used, the group consists of all mobiles within the geographical area at the time of the broadcast.

A selected mobile 6 receiving the message transmits a confirmation of receipt back to its respective cellsite 5. From now on, until an update situation, the system will not contact this mobile 6 again.

The mobile 6 recognizes the message as SMS data and passes it to a SIM card 7, which is a small self-contained microprocessor, held in a slot in the mobile 6. The SIM card 7 in turn recognizes the ECS using special hardware and software and stores the message in memory in such a way that it may not be overwritten by the subscriber. Known SIM cards contain a large number of fixed memory locations in which the subscriber can store frequently dialed numbers and corresponding alphanumeric tags. The SIM card 7 of the invention stores the message in one of these locations, and then carries out a write protect operation. The locations dedicated to storing write protected messages may be designated by code numbers relating to a particular category of advertiser. Thus, for example, car hire company telephone numbers can be stored in location 01, hotel reservations in location 02 and so on.

Figure 2:
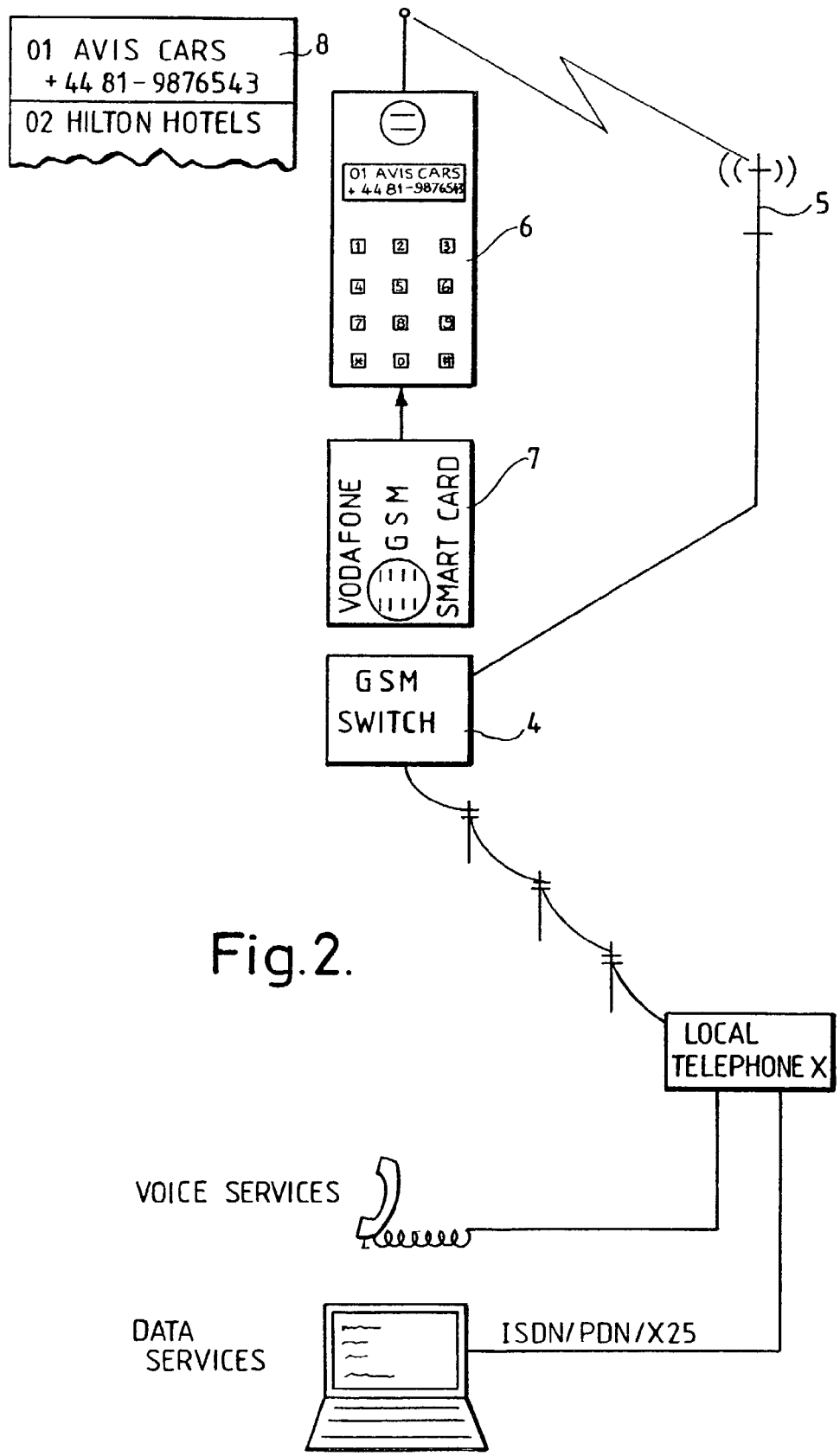
FIG. 2 shows a process in which a subscriber unit transmits a message and requested information.

FIG. 2 shows a call placing process in which a subscriber communicates with an advertiser. The subscriber, remembering that the car hire company's number is in location 01 as shown at 8, keys in a short code corresponding to the location, such as 01#. The mobile 6 then interrogates the SIM card 7 to retrieve the telephone number from the location. The SIM card 7 provides both the number and the alphanumeric tag giving the company's name and displays it to the subscriber. The user confirms that he wishes to proceed by pressing SEND.

Next, the mobile obtains a voice channel through which the call proceeds to the dialed number. The GSM system automatically handles intra-network and inter-network hops. At this point the subscriber can hold a voice conversation with the company.

Providing the correct equipment has been installed at the company, as soon as the call is answered, subscriber identity information read from the SIM card 7 gives the company immediate customer billing details such as a name and address.

The SIM card 7 also contains information detailing the subscriber's credit account. This information is held in a separate, secure memory location, accessible only when the subscriber enters a mandatory PIN number, known only to himself, thus confirming that the mobile has not been stolen or lost. When the subscriber has confirmed his car hire deal, he enters the PIN number into the mobile 6, requesting the credit information from the SIM card 7. The SIM card 7 supplies the information and the mobile uses existing voice/data techniques to transmit the information to the company, in a format secure against detection by fraudsters. The sale is confirmed by the company or its equipment and the call is terminated.

In this example, it is also possible to obtain a telephone or fax number from the operator-assisted directory enquiries system without the subscriber having to manually enter the number into the communications terminal which he desires to use.

To use this feature, the subscriber calls network directory enquiries and gives the name of the person, company or service of which he wishes to ascertain the telephone number, as well as any additional information requested by the operator answering the call. The operator then locates the number, confirms it and enquires as to whether the number is to be transmitted verbally, transferred over SMS into a given memory location of the subscriber's SIM card or both.

If the subscriber chooses a SIM update, the voice call is terminated and the operator initiates the SMS process by entering a sequence into a computer or pressing a dedicated button. The telephone number is then encoded into an ECS message at the despatch center and is posted across the network to the subscriber's communications terminal, which transmits a confirmation to the despatch center. Thus, the retry mechanism, which operates until such a confirmation is received, is suspended.

The communications terminal recognizes the message as SMS data, passes it to the SIM card, and if capable, displays a "message received" banner. The SIM card in turn recognizes the ECS using special hardware and software, and decodes it accordingly. The number, and any associated alphanumeric tag, which would normally consist of the name of the person or company, are recovered together with the memory location in which they are intended to be stored. The number and name-tag are then written to that location and are write-protected if requested by the subscriber, the overwrite protection being encoded into the message at source.

Subsequently, the subscriber attempts to place a call to the number in the known memory location by keying in the memory location number. The SIM card passes the telephone or fax number to the communications terminal on demand, and upon receipt of the subscriber's confirmation, the communications terminal sets up the call to the desired number.

Figure 3:
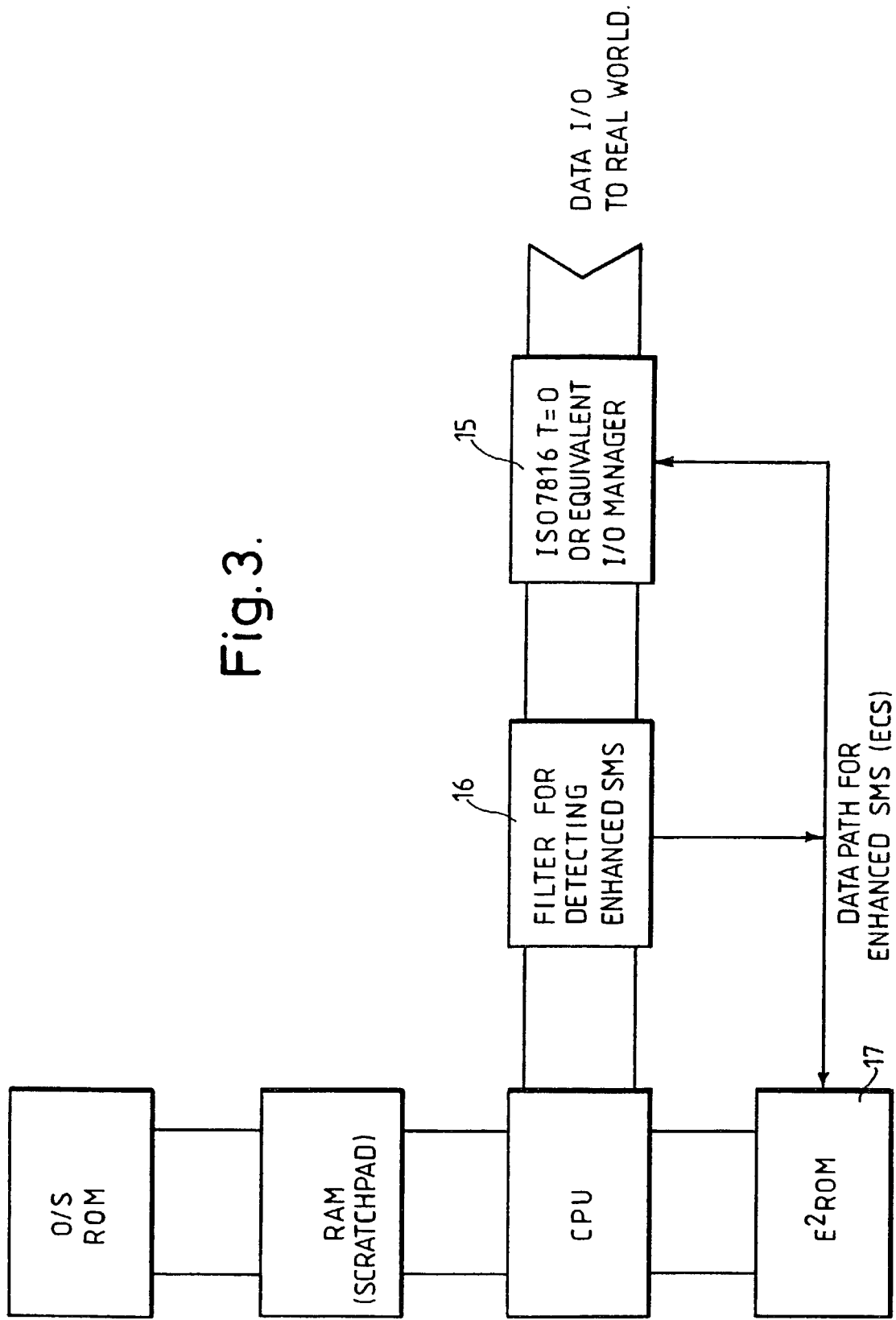
FIG. 3 is a block diagram showing elements of a module shown in FIGS. 1 and 2.

FIG. 3 shows the electronic structure of the SIM card 7. The card communicates with the mobile to which it is connected via an input/output (I/O) manager 15, preferably using the protocol ISO 7816 T=0. A filter 16 receives incoming data from the I/O manager and detects any ECS messages from among the short messages received. The ECS messages are sent directly to an extended erasable read only memory ($E^2ROM$) 17, which is preferably a "flash" $E^2ROM$. Data can also be output from the E²ROM directly to the I/O manager 15. The remaining blocks shown in FIG. 3 are standard components of a SIM card.

Figure 4:
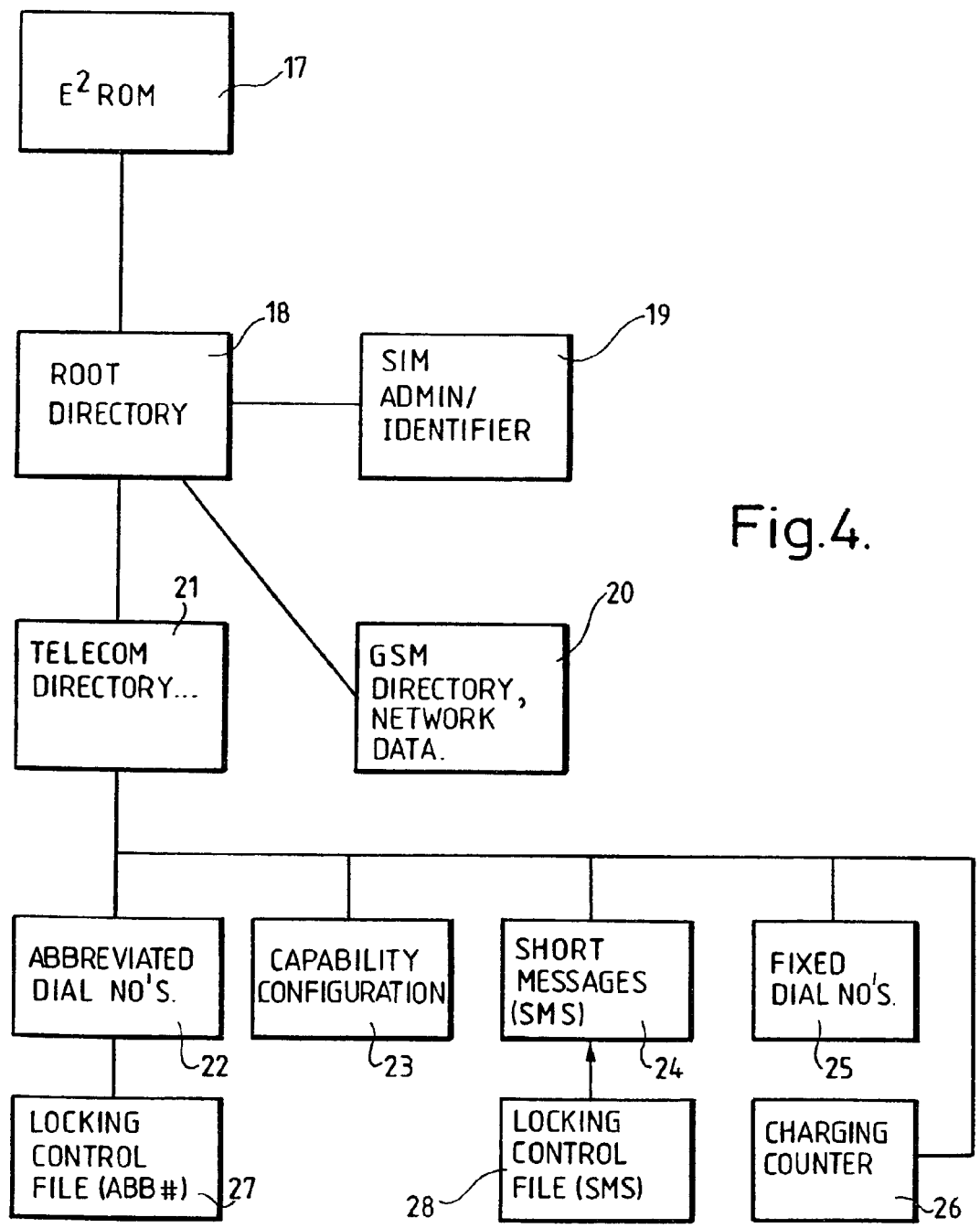
FIG. 4 shows details of one of the blocks shown in FIG. 3.

FIG. 4 shows how the E²ROM is organized. A root directory 18 contains a SIM administration and identifier 19, a GSM directory and network data 20, and a telecom directory 21.

The telecom directory in turn contains memory locations as follows: "abbreviated dial numbers" 22, "capability configuration" 23, "short messages" 24, "fixed dial numbers" 25, and "charging counter" 26. Each block represents a plurality of memory locations. The frequently dialed numbers and corresponding alphanumeric tags are stored at locations 22.

The "abbreviated dial numbers" locations 22 and the "short messages" locations 24 each have an associated locking control file 27, 28, respectively. The locking control files constitute means for read/write protecting and removing read/write protection from their associated memory locations. The locking control files 27, 28 will typically be in the telecom directory 21 as shown, however they can be located elsewhere such as in an administration directory.

Figure 5:
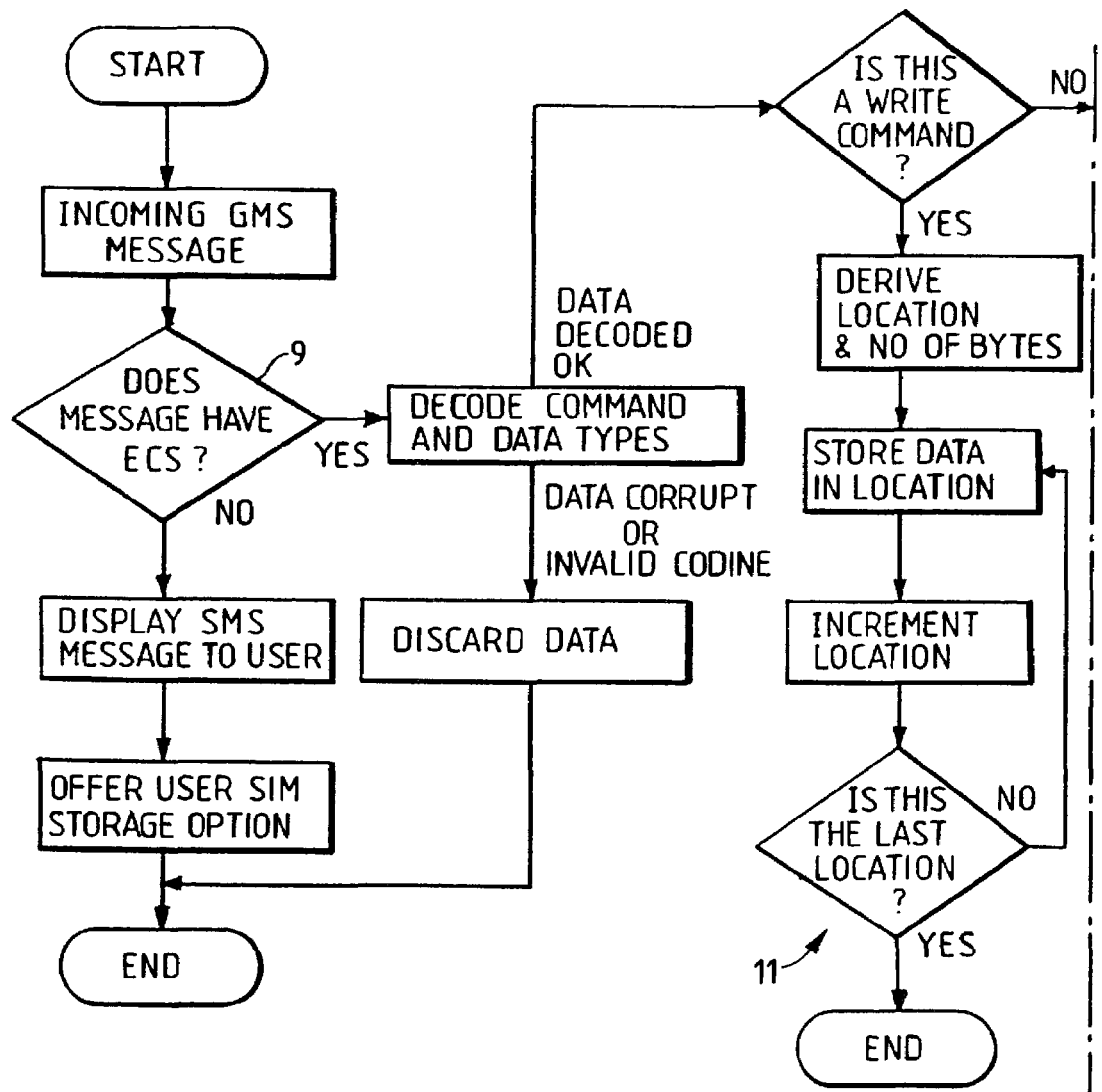
FIG. 5 is a flowchart showing the operation of the module shown in FIGS. 1 to 4.

FIG. 5 is a flowchart illustrating the operation of the SIM card 7, which uses the specially fabricated hardware and software which has been described above to implement the operations illustrated. At lozenge 9, messages, requests, and instructions having ECS are distinguished from those without. Each of these ECS types consists of a data stream headed by a command which is one of at least four types: write commands for the messages, read commands for the requests for information, attribute commands for lock or unlock instructions and run commands for instructions to run a program.

The command and data types are decoded at box 10 and acted on in one of the four paths 11-14.

Path 11 handles the write commands to store messages starting at a location specified therein. Path 12 handles the read commands; again, the requests for information contain a location to be accessed first. Successive locations are read and the data stored in a buffer until the required amount of data has been read. The data in the buffer is then encoded into the ECS format and despatched from the mobile using SMS to the calling party.

In path 13, attribute commands are used to lock or unlock specified memory locations and render them accessible or inaccessible, either to calling parties or to the subscriber. In path 14, run commands cause a program stored in the SIM card to be run.

The basic ECS system is expandable to up to 255 internal shell commands of which write, read, lock/unlock and run are four examples. The specific protocol used for the transfer of information is not fixed and could be ISO7816 T=0 or any other suitable protocol.

The internal shell commands are a supplement to the ability of the system to create external file objects within the SIM card 7. The file objects are of two types: Application Data File Programs (ADFP's) containing functional data which can be executed by the SIM card processor and can self modify if required and Application Data Files (ADF's) containing non-functional data which does not have these capabilities. Existing ADF(P)'S can be modified over-the-air enabling advanced facilities such as personalization, re-personalization or downloadable phone book.

The SIM card 7 has a directory structure, similar to that of a computer disk, and new ADF(P)'S can be downloaded into any directory over the air. Also over the air, directories can be created, deleted and modified, multiple tree directory operations can be carried out and ADF(P)'S that are no longer required can be deleted. The amount of ADF(P) data which can be downloaded is limited only by the size of the E²ROM memory of the card.

The invention, as described, greatly extends the applications of SIM cards. For example, using the Value Added Services Directory, subscribers can book hotels and airline seats over their mobiles quickly and easily.

An additional advantage of this feature of the invention is that the geographical distribution of messages to cards in a specific area such as the South of France is facilitated. Thus advertisers can direct their messages to all mobile subscribers in the specific area. This, is particularly useful when subscribers "roam" from one area to another and have no knowledge of local services.

The directory enquiries download enables contact telephone or fax numbers to be delivered to a subscriber's communications terminal without any intervention by the subscriber. The process of manually entering a number whilst engaged in a call to the operator is often dangerous, especially when the subscriber is driving.

The ability of the system to download ADF(P)'S means that additional services can be added to the SIM card over the air while maintaining total compatibility with the existing cellular system. Thus the SIM card could acquire the functions of a credit card, passport, driving license, car park pass, membership card and so on, becoming a multi-service card. Also, dynamically updatable services can be added which require a different process to be run each time a service is accessed.

Once the card has extra services on it, it can be used outside of the mobile phone environment if desired as a standalone item. This can be read from or written to by a dedicated piece of hardware, such as a point of sale machine. If desired, the new services can be deleted, however the card will never lose its mobile phone SIM capability. In addition, if the card has extra services, they will continue to function even if the subscriber has been disconnected from the mobile phone network, unless otherwise desired.

Modifications are possible without departing from the scope of the invention. For example, the SIM card can be trained only to receive messages detailing services relevant to the subscriber's needs.

What is claimed is:

1. A method of communicating between a remote station and a GSM-compatible cellular telephone capable of two-way voice communication, comprising:

selectively transmitting from the remote station to the cellular telephone an SMS text message containing text;

selectively transmitting from the remote station to the cellular telephone an SMS write command message containing a write command and associated write data, the cellular telephone including a removably coupled SIM card;

the cellular telephone detecting an incoming communication as an incoming SMS write command message or an incoming SMS text message; and in the event the incoming communication is an SMS text message, displaying at least a portion of the text contained in the incoming SMS text message on a display associated with the cellular telephone; and in the event the incoming communication is an SMS write command message, the SIM card decoding the write command contained in the SMS write command message.

2. The method of claim 1, wherein the SMS write command message comprises a command embedded in the incoming communication.

3. The method of claim 2, wherein the cellular telephone distinguishes an SMS message from other message types, and passes the SMS message to the SIM card, which decodes the embedded command if the SMS message comprises the SMS write command.

4. The method of claim 1, wherein the incoming communication includes a telephone number requested by a user of the GSM-compatible cellular telephone from a directory assistance service.

5. The method of claim 1, wherein the write command is automatically executed by a processor in the SIM card to cause the associated write data to be written into a memory of the GSM-compatible cellular telephone, without requiring user intervention.

6. The method of claim 1, further comprising selectively transmitting an SMS read command message which includes a read command.

7. The method of claim 1, further comprising selectively transmitting an SMS run command message which includes a run command.

8. The method of claim 1, further comprising selectively transmitting an SMS attribute command message which includes an attribute command which has the effect of locking an indicated portion of the memory is to prevent the indicated portion of a memory of the GSM-compatible cellular telephone from being overwritten by a user of the GSM-compatible cellular telephone.

9. A GSM-compatible telecommunications network for communicating with a plurality of cellular telephones, comprising:
at least one cellular telephone containing a removably coupled SIM card; and
at least one host station which selectively transmits an SMS text message containing text, or an SMS write command message containing a write command and associated write data, to the at least one cellular telephone;
wherein the at least one cellular telephone detects an incoming communication as an incoming SMS write command message or as an incoming SMS text message;
and wherein, in the event the incoming communication is an incoming SMS text message, a display associated with the at least one cellular telephone displays at least a portion of the text contained in the incoming SMS text message;
and wherein, in the event the incoming communication is an incoming SMS write command message, the SIM card decodes the write command contained in the incoming SMS write command message.

10. The network of claim 9, wherein the GSM-compatible cellular telephone includes a memory having first and second sets of memory locations, and wherein in the event the incoming communication is an SMS text message, storing at least a portion of the text contained in the SMS text message in the first set of memory locations, and in the event the incoming communication is an SMS command message, storing at least a portion of the associated write data in the second set of memory locations.

11. The network of claim 9, wherein the GSM-compatible cellular telephone includes a memory having first and second sets of memory locations, and wherein the first set of memory locations are prevented from being overwritten from the cellular telephone, and the second set of memory locations are not prevented from being overwritten from the cellular telephone.

12. The network of claim 9, wherein:
the detecting is performed by a first processor contained in a main body of the GSM-compatible cellular telephone;
in the event the incoming communication is an SMS write command message, the first processor passing the SMS write command message and the associated write data to the SIM card; and
a second processor contained in the SIM card executing the write command.

13. The network of claim 9, wherein the associated write data is prevented from being overwritten by a user of the GSM-compatible cellular telephone.

14. The network of claim 9, wherein the associated write data includes information relevant to a specific geographical area of a user of the GSM-compatible cellular telephone.

15. The network of claim 9, wherein the associated write data includes application program data files.

16. The network of claim 9, wherein the at least one host station selectively transmits to the cellular telephone the SMS write command message containing a write command and associated write data without requiring user interaction.

17. A telecommunications network for communicating with a plurality of cellular telephones, comprising:
a cellular telephone capable of two-way voice communication; and
at least one remote station which selectively transmits to the cellular telephone a message of a first message type or a second message type, wherein the first message type is formatted to contain text to be displayed on a display of the cellular telephone and the second message type is formatted to contain a command and data associated with the command, wherein the command indicates to the cellular telephone to execute at least one instruction for performing an operation other than to support the displaying of text;
wherein the cellular telephone distinguishes the message as being of either the first message type or the second message type,
and, if the message is of the first message type, displaying at least a portion of the text on the display of the cellular telephone,
and automatically, if the message is of the second message type, executing the at least one instruction;
wherein the message is wirelessly carried from the remote station to the cellular telephone using a common short message service protocol over a common short message service channel, regardless of whether the message is of the first or the second message type;
wherein the remote station is configured to transmit messages of the first and the second message types, and the cellular telephone is configured to receive and process messages of the first and the second message types; and
wherein remotely located information is downloaded to the cellular telephone.

18. The network of claim 17, wherein the command is a run command that causes a prestored set of instructions, including the at least one instruction, to be executed.

19. The network of claim 17, wherein the operation is performed without requiring any intervention by a user of the cellular telephone.

20. The network of claim 17, wherein the short message service protocol is an SMS protocol compliant with a GSM cellular telephony standard, and the short message service channel is compliant with a GSM cellular telephony standard.

* * * * *